US010785460B2

(12) United States Patent
Ikeura et al.

(10) Patent No.: US 10,785,460 B2
(45) Date of Patent: Sep. 22, 2020

(54) PROJECTION DISPLAY APPARATUS AND METHOD OF CONTROLLING PROJECTION DISPLAY APPARATUS

(71) Applicant: SONY CORPORATION, Tokyo (JP)

(72) Inventors: Kazumasa Ikeura, Tokyo (JP); Hiroyuki Meguro, Kanagawa (JP); Masanobu Hida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/334,988

(22) PCT Filed: Sep. 15, 2017

(86) PCT No.: PCT/JP2017/033504
§ 371 (c)(1),
(2) Date: Mar. 20, 2019

(87) PCT Pub. No.: WO2018/083895
PCT Pub. Date: May 11, 2018

(65) Prior Publication Data
US 2019/0268576 A1  Aug. 29, 2019

(30) Foreign Application Priority Data
Nov. 2, 2016  (JP) .................................. 2016-215338

(51) Int. Cl.
*H04N 9/31*  (2006.01)
*G02B 26/00*  (2006.01)
(Continued)

(52) U.S. Cl.
CPC ......... *H04N 9/3114* (2013.01); *G02B 26/008* (2013.01); *G03B 21/14* (2013.01);
(Continued)

(58) Field of Classification Search
CPC .... H04N 9/3114; H04N 9/312; H04N 9/3182; H04N 5/74; G02B 26/008; G03B 21/14;
(Continued)

(56) References Cited

U.S. PATENT DOCUMENTS

2011/0242497 A1  10/2011  Fukano
2011/0242502 A1  10/2011  Shibasaki
(Continued)

FOREIGN PATENT DOCUMENTS

JP   2011-215332 A   10/2011
JP   2011-216294 A   10/2011
(Continued)

OTHER PUBLICATIONS

International Search Report dated Dec. 19, 2017 in PCT/JP2017/033504 filed on Sep. 15, 2017.

*Primary Examiner* — Michael E Teitelbaum
(74) *Attorney, Agent, or Firm* — Oblon, McClelland, Maier & Neustadt, L.L.P.

(57) ABSTRACT

A projection display apparatus according to an embodiment of the disclosure includes: a projection unit including a light source section, a wavelength converter including a discoid member and a motor section, the discoid member including a wavelength conversion layer that converts outgoing light from the light source section to light having a wavelength range different from that of the outgoing light, and the motor section rotating the discoid member, and a spatial modulation element that generates image light by modulating light from the light source section and the wavelength converter on the basis of an inputted image signal; and a control unit that controls intensity of the outgoing light emitted from the light source section and a number of rotation of the discoid member in a state where the image light is generated by the spatial modulation element.

4 Claims, 11 Drawing Sheets

(51) Int. Cl.
    *G03B 21/20*   (2006.01)
    *G02B 21/14*   (2006.01)
    *H04N 5/74*    (2006.01)
    *G06T 7/00*    (2017.01)
    *G03B 21/14*   (2006.01)

(52) U.S. Cl.
    CPC ............. *G03B 21/204* (2013.01); *H04N 5/74* (2013.01); *H04N 9/312* (2013.01); *H04N 9/3182* (2013.01); *G06T 7/0002* (2013.01); *G06T 2207/30168* (2013.01)

(58) Field of Classification Search
    CPC ................ G03B 21/204; G06T 7/0002; G06T 2207/30168
    See application file for complete search history.

(56) References Cited

U.S. PATENT DOCUMENTS

| | | | |
|---|---|---|---|
| 2013/0063704 A1 | | 3/2013 | Hu et al. |
| 2013/0083299 A1 | | 4/2013 | Chen et al. |
| 2013/0169939 A1 | | 7/2013 | Fukano |
| 2015/0172645 A1 | | 6/2015 | Nobori |
| 2017/0094751 A1* | | 3/2017 | Suzuki .................. H05B 45/20 |

FOREIGN PATENT DOCUMENTS

| | | |
|---|---|---|
| JP | 2013-97229 A | 5/2013 |
| JP | 2015-119312 A | 6/2015 |
| JP | 2016-186556 A | 10/2016 |

\* cited by examiner

PROJECTION DISPLAY APPARATUS AND METHOD OF CONTROLLING PROJECTION DISPLAY APPARATUS

TECHNICAL FIELD

The present disclosure relates to a projection display apparatus including a phosphor wheel that converts excitation light to fluorescence, for example, and a method of controlling the same.

BACKGROUND ART

A projection display apparatus (projector) that projects a personal computer screen, a video image, or the like on a screen is loaded with a light source device that uses as a light source a semiconductor light emitting element such as a light emitting diode (LED), a laser diode (LD), an organic electroluminescence (EL), or the like.

Among them, as the light source device that uses the LED or the LD as the light source, there is proposed an illumination device that extracts white light as fluorescence by applying light from the LED or the LD to a phosphor (see, for example, PTL 1). The illumination device (light source device) includes an excitation light source that emits excitation light for exciting the phosphor and a fluorescence disc (phosphor wheel) having the phosphor (phosphor layer) formed thereon for converting the excitation light to the fluorescence. Such a light source device drives the phosphor wheel in rotation by a motor when applying the excitation light to the phosphor layer.

CITATION LIST

Patent Literature

PTL 1: Japanese Unexamined Patent Application Publication No.

SUMMARY OF THE INVENTION

Incidentally, a home projector has become popular recently, and it is desired to reduce noise at the time of projection.

It is desirable to provide a projection display apparatus that makes it possible to reduce the noise and a method of controlling the projection display apparatus.

A projection display apparatus according to an embodiment of the present disclosure includes a projection unit including a light source section, a wavelength converter including a discoid member and a motor section, the discoid member including a wavelength conversion layer that converts outgoing light from the light source section to light having a wavelength range different from that of the outgoing light, the motor section rotating the discoid member, and a spatial modulation element that generates image light by modulating light from the light source section and the wavelength converter on the basis of an inputted image signal, and a control unit that controls intensity of the outgoing light emitted from the light source section and a number of rotation of the discoid member in a state where the image light is generated by the spatial modulation element.

A method of controlling a projection display apparatus according to an embodiment of the present disclosure includes converting outgoing light emitted from a light source section to light having a wavelength range different from that of the outgoing light in a wavelength conversion layer, generating image light by modulating, on the basis of an inputted image signal, the outgoing light of which the wavelength is converted, in a spatial modulation element, and rotating a discoid member including the wavelength conversion layer by a motor section and respectively controlling intensity of the outgoing light and a number of rotation of the discoid member in a state where the image light is generated by the spatial modulation element.

The projection display apparatus according to an embodiment of the present disclosure and the method of controlling the projection display apparatus according to an embodiment make it possible to change the number of rotation of the discoid member in accordance with change in the intensity of the outgoing light emitted from the light source section by providing the control unit that controls the intensity of the outgoing light emitted from the light source section and the number of rotation of the discoid member included in the wavelength converter in the state where the image light is generated by the spatial modulation element.

The projection display apparatus according to an embodiment of the present disclosure and the method of controlling the projection display apparatus according to an embodiment make it possible to change the number of rotation of the discoid member in accordance with the change in the intensity of the outgoing light emitted from the light source section because the control unit that controls the intensity of the outgoing light emitted from the light source section and the number of rotation of the discoid member included in the wavelength converter is provided in the state where the image light is generated by the spatial modulation element. It is thus possible to reduce the noise.

It is to be noted that the effects described herein are not necessarily limited but may include any of the effects described in the present disclosure.

MODES FOR CARRYING OUT THE INVENTION

Figure 1:
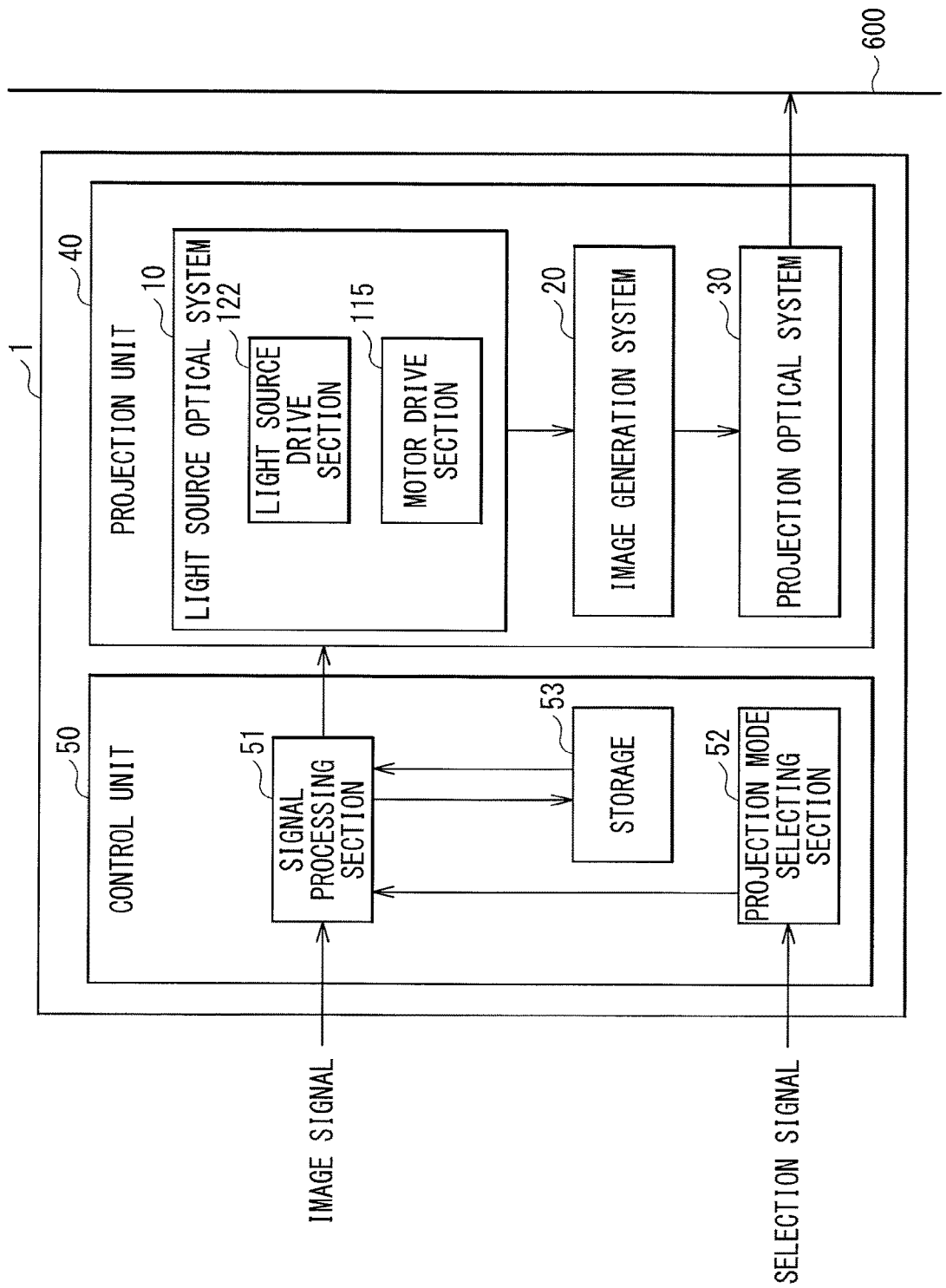
FIG. 1 is a block diagram illustrating a display system of a projection display apparatus according to an embodiment of the present disclosure.

In the following, embodiments of the present disclosure are described in detail with reference to the drawings. The following description is merely a specific example of the present disclosure and the present disclosure should not be limited to the following implementations. Moreover, the present disclosure is not limited to arrangements, dimensions, dimensional ratios, and the like of each component illustrated in the drawings. It is to be noted that the description is made in the following order.
1. Embodiment (An example of a projection display apparatus having a plurality of control modes)
  1-1. Configuration of a projection display apparatus
  1-2. Method of controlling the projection display apparatus
  1-3. Workings/effects
2. Modification Examples
  2-1. Modification example 1 (An example of the projection display apparatus that automatically adjusts intensity of excitation light EL1 and a number of rotation of a phosphor wheel 11)
  2-2. Modification example 2 (An example of the projection display apparatus using a transmissive spatial modulation element)

1. Embodiment

Figure 2:
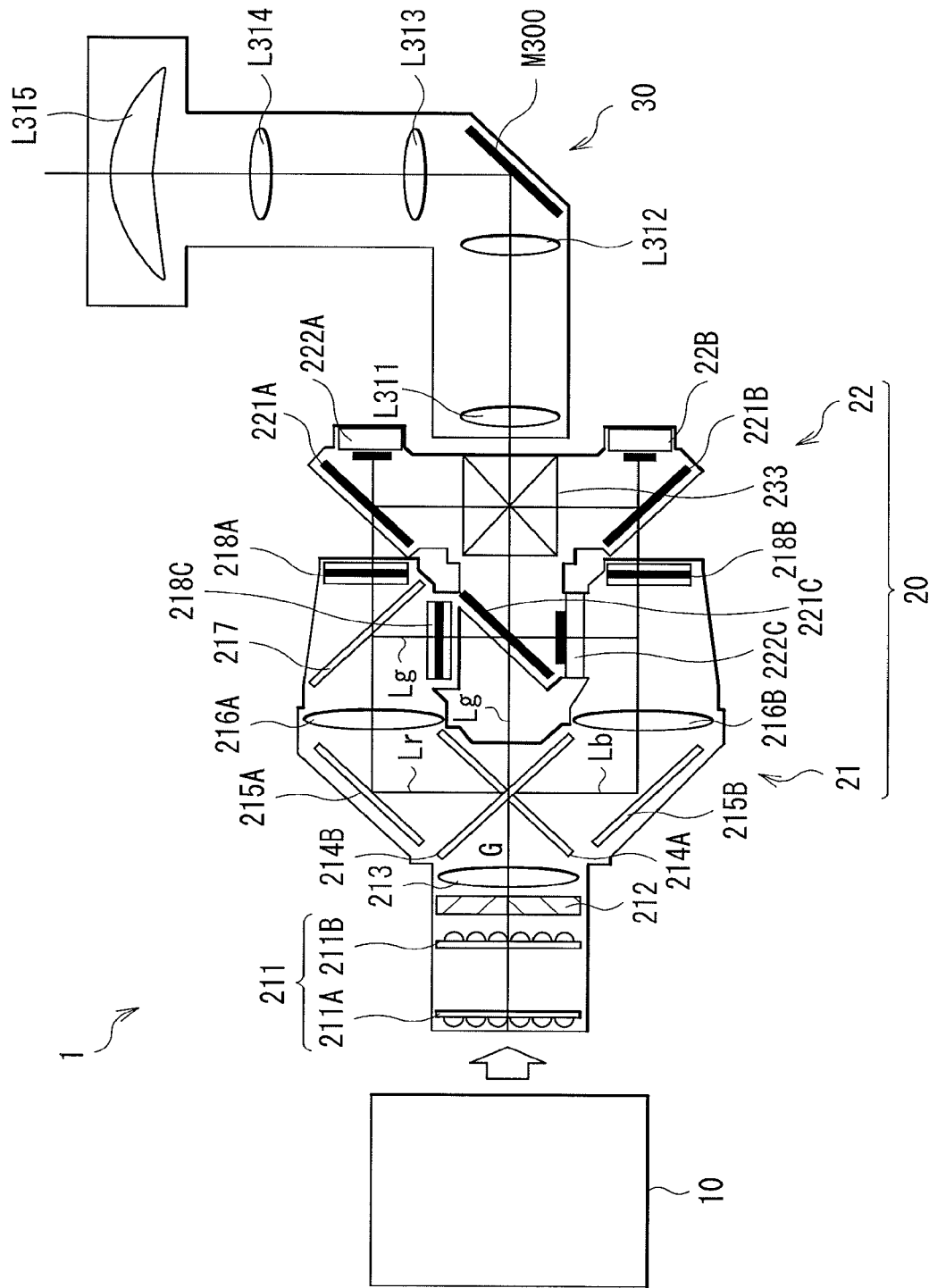
FIG. 2 is an outline drawing of an example of a configuration of an optical system of the projection display apparatus according to an embodiment of the present disclosure.
Figure 3:
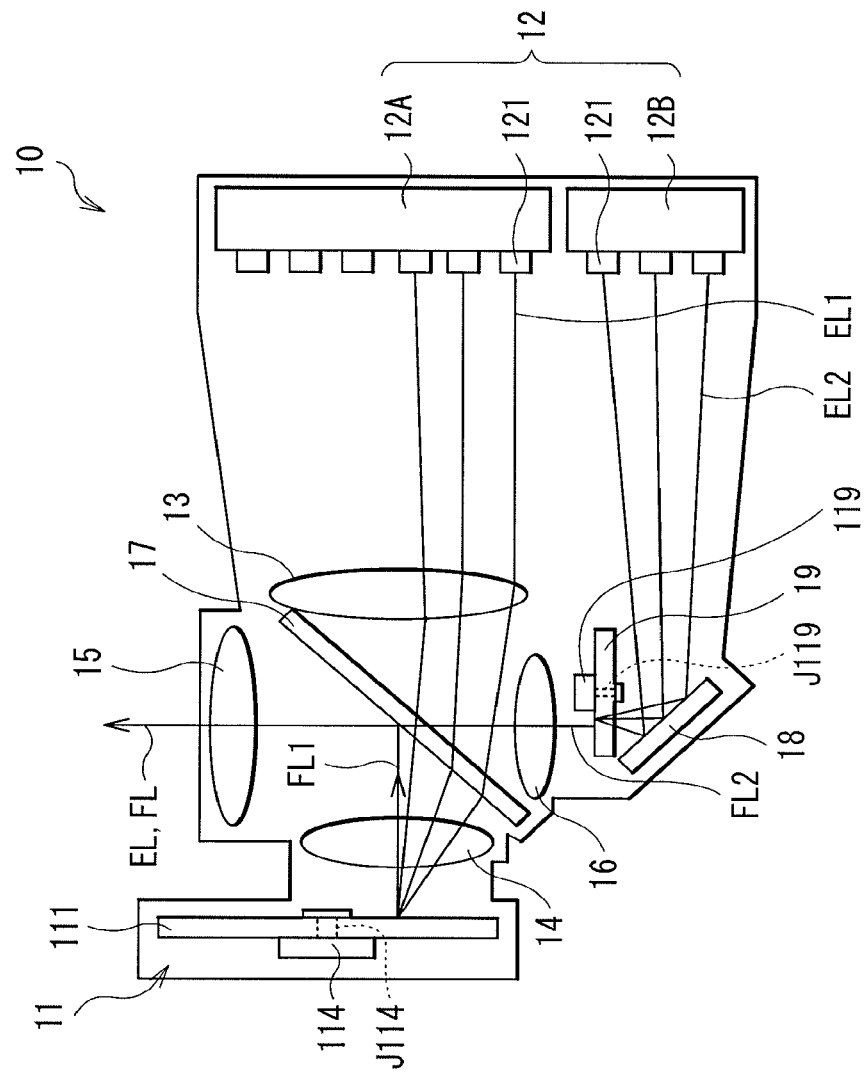
FIG. 3 is an outline drawing of a configuration example of a light source optical system illustrated in FIG. 2.

FIG. 1 illustrates, in a block diagram, a display system of a projection display apparatus (projection display apparatus 1) according to an embodiment of the present disclosure. FIG. 2 illustrates an example of a configuration of an optical system of the projection display apparatus 1 according to the present disclosure. FIG. 3 illustrates an example of a configuration of a light source optical system 10 illustrated in FIG. 2. The projection display apparatus 1 is a projection display apparatus that projects an image (image light) on a screen 600 (projection plane) such as a wall surface, and includes a projection unit 40 including the light source optical system 10, an image generation system 20, and a projection optical system 30, and a control unit 50 that controls drive of the projection unit 40. It is to be noted that "image" here includes a still image and a moving image.

The display system of the projection display apparatus 1 according to the present embodiment includes, as illustrated in FIG. 1, the above-described projection unit 40 and the control unit 50, and the control unit 50 includes, for example, a signal processing section 51, a projection mode selecting section 52, and a storage 53. The light source optical system 10 included in the projection unit 40 includes a light source section 12 and a phosphor wheel 11, and further includes a light source drive section 122 that drives the light source section 12 and the phosphor wheel 11 and a motor drive section 115. In the projection display apparatus 1 according to the present embodiment, although details will be described later, the control unit 50 is allowed to control intensity of excitation light (outgoing light) emitted from the light source section 12 and a number of rotation of the phosphor wheel 11 (wavelength converter) (specifically, for example, a number of rotation of a motor section 114) on the basis of a signal inputted from the outside (for example, by a user) in a state where image light is generated by a spatial modulation element (at the time of image projection). Specifically, in the projection display apparatus 1, the control unit 50 is allowed to control, at the time of image projection, the number of rotation of the phosphor wheel 11 (the number of rotation of the motor section 114) in accordance with the intensity of the excitation light emitted from the light source section 12.

1-1. Configuration of Projection Display Apparatus

FIG. 2 exemplifies a 3LCD reflective projector (projection display apparatus 1) that modulates light using reflective liquid crystal panels (LCD, liquid crystal panels 222A, 222B, and 222C). The projection unit 40 of the projection display apparatus 1 according to the present embodiment includes, as described above, the light source optical system 10, the image generation system 20 including an illumination optical system 21 and an image generation section 22, and the projection optical system 30. It is to be noted that the projection display apparatus 1 according to the present disclosure is also applicable to a projector using a transmissive liquid crystal panel, a digital micro-mirror device (DMD: Digital Micro-mirror Device), or the like instead of the reflective liquid crystal panel. The projector using the transmissive liquid crystal panel will be described in modification examples to be described later.

The light source optical system 10 includes, as illustrated in FIG. 3, the phosphor wheel 11 (wavelength converter), the light source section 12 that emits excitation light or laser light, lenses 13 to 16, a dichroic mirror 17, a reflective mirror 18, and a diffusion plate 19. The phosphor wheel 11 is rotatably supported by a shaft J114. The diffusion plate 19 is rotatably supported by a shaft J119. The light source section 12 includes a first laser group 12A and a second laser group 12B. The first laser group 12A includes an array of a plurality of semiconductor laser elements 121A that oscillate excitation light (for example, a wavelength of 445 nm or 455 nm) and the second laser group 12B includes an array of a plurality of semiconductor laser elements 121B that oscillate blue laser light (for example, a wavelength of 465 nm). Here, for convenience, the excitation light oscillated from the first laser group 12A is denoted with EL1 and the blue laser light (hereinbelow, referred to simply as "blue light") oscillated from the second laser group 12B is denoted with EL2.

Figure 4A:
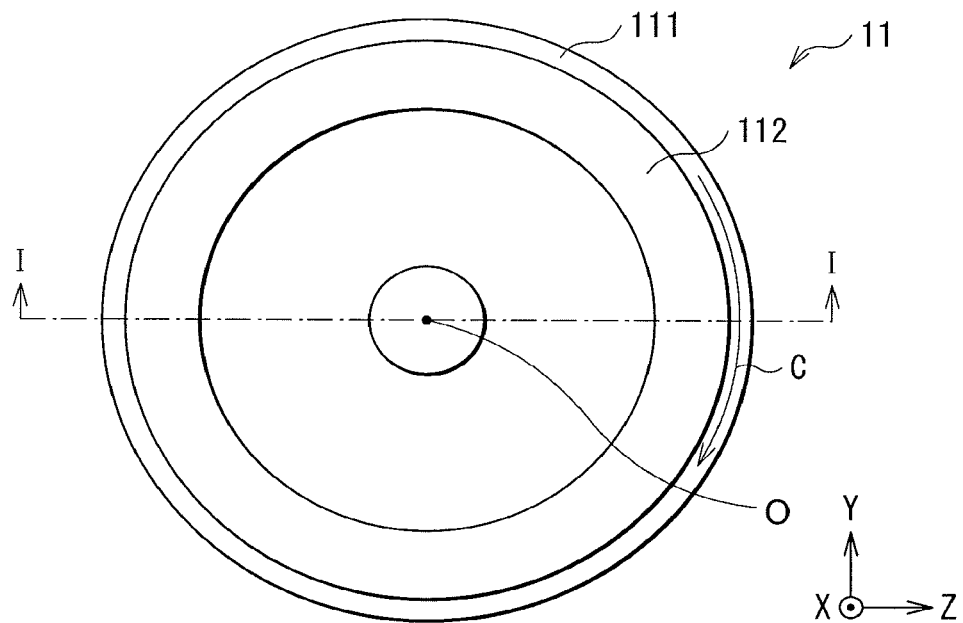
FIG. 4A is a schematic plan view of a phosphor wheel.
Figure 4B:
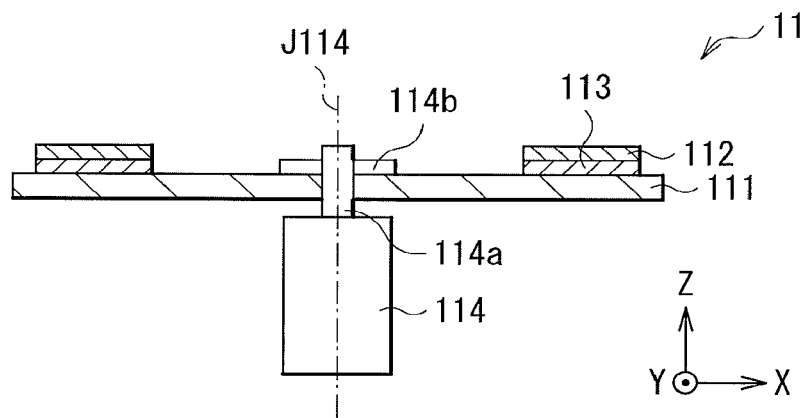
FIG. 4B is a schematic cross-sectional view of the phosphor wheel illustrated in FIG. 4A.

FIG. 4A illustrates a plan configuration of the phosphor wheel 11, and FIG. 4B illustrates a cross-sectional configuration of the phosphor wheel 11 taken along a line I-I illustrated in FIG. 4A. The phosphor wheel 11 is, for example, a reflective light-emitting element in which, for example, a reflection layer 113 and a phosphor layer 112 (wavelength conversion layer) are provided in this order, for example, along a circumferential direction, for example, on a plate-shaped member 111 having a discoid shape (discoid member), for example. The plate-shaped member 111 is coupled to the motor section 114 via a rotary shaft 114a and fixed by a fixing hub 114b, for example. The plate-shaped member 111 is allowed to be rotated by the motor section 114 in a direction of an arrow C, for example, around the shaft J114 passing through a center O of the plate-shaped member 111.

The plate-shaped member 111 not only functions as a substrate that supports the phosphor layer 112 and the reflection layer 113 but also functions as a heat dissipation member. The plate-shaped member 111 preferably includes a constituent material having high heat conductivity and highly compatibility with the phosphor layer 112 and the reflection layer 113. Specific examples include an inorganic material such as a metallic material and a ceramic material.

The phosphor layer 112 is excited by the light (excitation light EL1) applied from the light source section 12 (specifically, the first laser group 12A) to output fluorescence (fluorescence FL) having a wavelength range different from the wavelength range of the light. The phosphor layer 112 contains a fluorescent substance that is excited by the blue laser light having a center wavelength at about 445 nm to emit fluorescence, and converts the blue laser light applied from the light source section 12 to yellow fluorescence, for example, and outputs the resultant light. As the fluorescent substance contained in the phosphor layer 112, for example, a YAG (yttrium aluminum garnet)-based phosphor is used. It is to be noted that the type of the fluorescent substance, the wavelength range of the light to be excited, and the wavelength range of the visible light generated by excitation are not limited.

The reflection layer 113 functions to reflect the excitation light EL1 applied from the light source section 12 and the fluorescence FL derived from the phosphor layer 112 in an incident direction of the excitation light EL1 and to thereby improve luminous efficiency in the phosphor wheel 11. The reflection layer 113 is provided on the plate-shaped member 111 and includes a metal film containing a metallic element such as Al (aluminum), Ag (silver), or Ti (titanium), in addition to, for example, a dielectric multilayer. It is to be noted that the reflection layer 113 may be omitted in a case where the plate-shaped member 111 is configured by a material having light reflectivity.

The phosphor wheel 11 is disposed to allow the excitation light EL1 having passed from the first laser group 12A through the lens 13, the dichroic mirror 17, and the lens 14 in sequence, to enter the phosphor layer 112. The fluorescence FL converted by the phosphor layer 112 is reflected by the reflection layer 113 to the light source section 12 side, and reflected by the dichroic mirror 17 in the direction of the lens 15. The fluorescence FL reflected by the dichroic mirror 17 passes through the lens 15 toward the outside, i.e. toward the illumination optical system 21 of the image generation system 20.

The diffusion plate 19 diffuses the laser light EL2 having traveled from the second laser group 12B through the reflective mirror 18. After passing through the lens 16 and the dichroic mirror 17, the laser light EL2 diffused by the diffusion plate 19 passes through the lens 15 toward the outside, i.e. toward the illumination optical system 21, along with the fluorescence FL.

Figure 5:
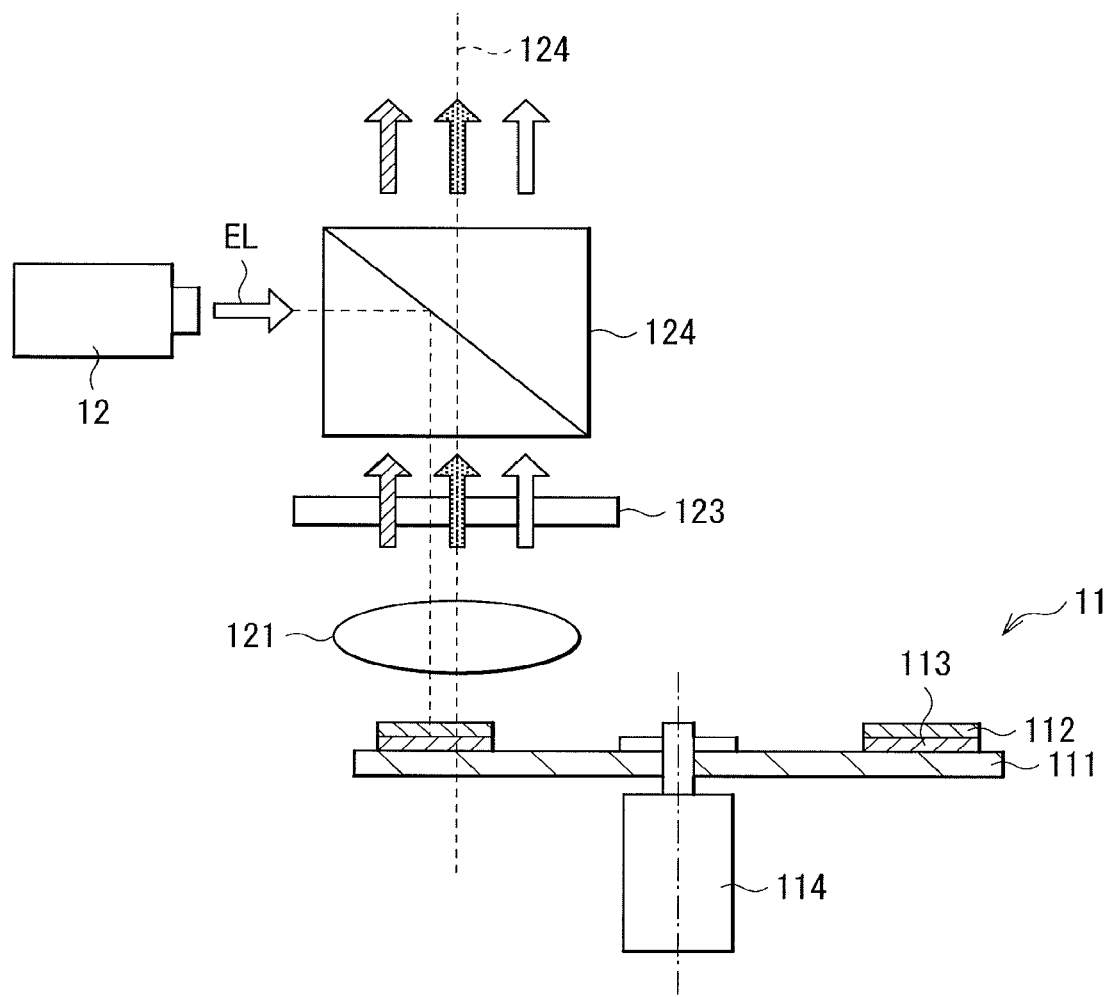
FIG. 5 is a schematic diagram illustrating a configuration of the light source optical system in a case of using a reflective phosphor wheel.

It is to be noted that the arrangement of each component included in the light source optical system 10 is not limited to the configuration illustrated in FIG. 3. For example, as illustrated in FIG. 5, the configuration may include the phosphor layer 112, a lens 121, a quarter-wavelength plate 123, and a polarization beam splitter 124 disposed on an optical path A of the fluorescence FL outputted from the phosphor layer 112 in this order from the phosphor wheel 11 side. In this case, the light source section 12 is disposed in a direction orthogonal to the optical path A of the fluorescence FL and at a position facing one light incident surface of the polarization beam splitter 124.

Figure 6:
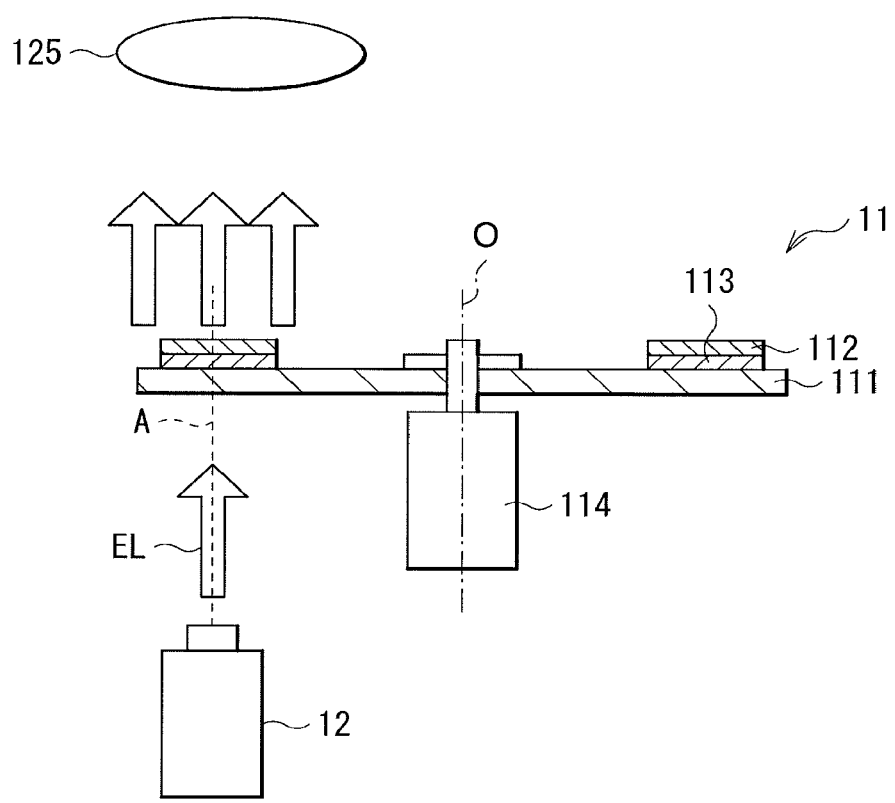
FIG. 6 is a schematic diagram illustrating a configuration of the light source optical system in a case of using a transmissive phosphor wheel.

Furthermore, although the reflective phosphor wheel 11 is illustrated in FIGS. 3, 4A, 4B, and 5, it is not limited thereto, and a transmissive phosphor wheel 11 may be used. FIG. 6 illustrates an arrangement example of each member in a case of using the transmissive phosphor wheel. In the case of using the transmissive phosphor wheel 11, for example, the light source section 12, the phosphor layer 112, and a condenser lens 125 are disposed in this order on the optical path A of the excitation light EL applied from the light source section 12, for example. In FIG. 6, the fluorescence FL outputted from the phosphor layer 112 passes through the condenser lens 125 toward the illumination optical system 21 of the image generation system 20.

The illumination optical system 21 includes fly-eye lenses 211 (211A and 211B), a polarization conversion element 212, a lens 213, dichroic mirrors 214A and 214B, reflective mirrors 215A and 215B, lenses 216A and 216B, a dichroic mirror 217, and polarizing plates 218A to 218C from a position closer to the light source optical system 10, for example.

The fly-eye lenses 211 (211A and 211B) are intended to homogenize illuminance distribution of white light from the lens 15 of the light source optical system 10. The polarization conversion element 212 functions to align polarization axes of incident light. For example, the polarization conversion element 212 converts light other than p-polarized light to the p-polarized light. The lens 213 focuses light from the polarization conversion element 212 toward the dichroic mirrors 214A and 214B. The dichroic mirrors 214A and 214B selectively reflects light in a predetermined wavelength range and selectively transmits light in other wavelength ranges. For example, the dichroic mirror 214A mainly reflects red light in a direction of the reflective mirror 215A. Moreover, the dichroic mirror 214B mainly reflects blue light in a direction of the reflective mirror 215B. Accordingly, mainly green light passes through both the dichroic mirrors 214A and 214B toward a reflective polarizing plate 221C (to be described later) of the image generation section 22. The reflective mirror 215A reflects the light (mainly red light) from the dichroic mirror 2141 toward the lens 216A, and the reflective mirror 215B reflects the light (mainly blue light) from the dichroic mirror 214 toward the lens 216B. The lens 216A transmits the light (mainly red light) from the reflective mirror 215A to focus the resulting light on the dichroic mirror 217. The lens 216B transmits the light (mainly blue light) from the reflective mirror 215B to focus the resulting light on the dichroic mirror 217. The dichroic mirror 217 selectively reflects green light and selectively transmits light in other wavelength ranges. The dichroic mirror 217 here transmits a red light component of the light from the lens 216A. In a case where the light from the lens 216A contains a green light component, the green light component is reflected toward the polarizing plate 218C. The polarizing plates 218A to 218C each include a polarizer having a polarizing axis in a predetermined direction. For example, in a case where the polarization conversion element 212 converts light to p-polarized light, the polarizing plates 218A to 218C transmit the p-polarized light and reflect s-polarized light.

The image generation section 22 includes reflective polarizing plates 221A to 221C, reflective liquid crystal panels 222A to 222C (spatial modulation elements), and a dichroic prism 223.

The reflective polarizing plates 221A to 221C respectively transmit light having the same polarizing axis as that of the polarized light from the polarizing plates 218A to 218C (for example, p-polarized light), and reflect light having any other polarizing axis (for example, s-polarized light). Specifically, the reflective polarizing plate 221A transmits the p-polarized red light from the polarizing plate 218A in a direction of the reflective liquid crystal panel 222A. The reflective polarizing plate 221B transmits p-polarized blue light from the polarizing plate 218B in a direction of the reflective liquid crystal panel 222B. The reflective polarizing plate 221C transmits p-polarized green light from the polarizing plate 218C in a direction of the reflective liquid crystal panel 222C. Moreover, the p-polarized green light having passed through both the dichroic mirrors 214A and 214B and entered the reflective polarizing plate 221C passes through the reflective polarizing plate 221C and enters the dichroic prism 223 as it is. Furthermore, the reflective polarizing plate 221A reflects the s-polarized red light from the reflective liquid crystal panel 222A and allows it to enter the dichroic prism 223. The reflective polarizing plate 221B reflects the s-polarized blue light from the reflective liquid crystal panel 222B and allows it to enter the dichroic prism 223. The reflective polarizing plate 221C reflects the s-polarized green light from the reflective liquid crystal panel 222C and allows it to enter the dichroic prism 223.

The reflective liquid crystal panels 222A to 222C spatially modulate the red light, the blue light, or the green light, respectively.

The dichroic prism 223 combines the red light, the blue light, or the green light entered there and outputs the resulting light toward the projection optical system 30.

The projection optical system 30 includes lenses L311 to L315 and a mirror M300. The projection optical system 30 amplifies the outgoing light from the image generation section 22 and projects it on the screen 600 or the like.

Subsequently, an operation of the projection display apparatus 1 is described with reference to FIGS. 1, 2, and 3.

First, in the light source optical system 10, the motor sections 114 and 119 are driven, and the phosphor wheel 11 and the diffusion plate 19 rotate. Thereafter, the excitation light EL1 and the laser light EL2 are oscillated respectively from the first laser group 12A and the second laser group 12B of the light source section 12.

The excitation light EL1 is oscillated from the first laser group 12A, passes through the lens 13, the dichroic mirror 17, and the lens 14 in sequence, followed by being applied on the phosphor layer 112 of the phosphor wheel 11. The phosphor layer 112 of the phosphor wheel 11 absorbs a portion of the excitation light ELL converts it to fluorescence FL1 that is yellow light, and outputs it toward the lens 14. After being reflected by the dichroic mirror 17, the fluorescence FL1 passes through the lens 15 toward the illumination optical system 21.

The laser light EL2 is oscillated from the second laser group 12B, travels through the reflective mirror 18, followed by being applied on the diffusion plate 19. The diffusion plate 19 diffuses the laser light EL2 and outputs it toward the lens 16. After passing through the dichroic mirror 17, the laser light EL2 passes through the lens 15 toward the illumination optical system 21.

In this manner, the light source optical system 10 allows white light resulting from a combination of the fluorescence FL (FL1) as yellow light and the blue laser light (FL2) to enter the illumination optical system 21.

After passing through the fly-eye lenses 211 (211A and 211B), the polarization conversion element 212, and the lens 213 in sequence, white light Lw from the light source optical system 10 reaches the dichroic mirrors 214A and 214.

The dichroic mirror 214A mainly reflects red light Lr, and the red light Lr passes through the reflective mirror 215A, the lens 216A, the dichroic mirror 217, the polarizing plate 218A, and the reflective polarizing plate 221A in sequence and reaches the reflective liquid crystal panel 222A. After being spatially modulated by the reflective liquid crystal panel 222A, the red light Lr is reflected by the reflective polarizing plate 221A and enters the dichroic prism 223. It is to be noted that, in a case where a green light component (Lg) is contained in the light reflected by the dichroic mirror 214A toward a reflective mirror 250A, the green light component (Lg) is reflected by the dichroic mirror 217, passes through the polarizing plate 218C and the reflective polarizing plate 221C in sequence, and reaches the reflective liquid crystal panel 222C. The dichroic mirror 214B mainly reflects blue light Lb, which enters the dichroic prism 223 after a similar process. The green light Lg having passed through the dichroic mirrors 214A and 214 also enters the dichroic prism 223.

The red light Lr, the blue light Lb, and the green light Lg having entered the dichroic prism 223 are combined, followed by being outputted toward the projection optical system 30 as image light. The projection optical system 30 amplifies the image light from the image generation section 22 and projects it on the screen 600 or the like.

The control unit 50 includes, for example, a CPU (Central Processing Unit), a ROM (Read Only Memory), a RAM (Random Access Memory), and the like (none of which are illustrated). The CPU reads a control program stored in the ROM and deploys it in the RAM, and executes steps of the program on the RAM. The control unit 50 controls the entire operation of the projection display apparatus 1 by program execution by the CPU.

The control unit 50 further includes the signal processing section 51. The signal processing section 51 receives an image signal inputted from an external equipment such as a computer, a DVD player, and a TV tuner. The signal processing section 51 not only performs resizing, gamma adjustment, color adjustment, and the like, of an image by characteristic correction, amplification, or the like of the image signal, but also separates the image signal into respective image data of R, G, and B. Moreover, the signal processing section 51 generates optical modulation signals for driving the reflective liquid crystal panels 222A to 222C for respective color light and sends them to a drive section (not illustrated) of the image generation section 22.

The signal processing section 51 according to the present embodiment generates a signal (hereinafter, "drive current setting signal") for setting drive current of the light source section 12 (in particular, first laser group 12A), and supplies it to the light source drive section 122. The light source drive section 122 drives the first laser group 12A and the second laser group 12B included in the light source section 12 on the basis of the drive current setting signal to respectively emit the excitation light EL1 and the laser light EL2. Furthermore, the signal processing section 51 generates a signal for setting the number of rotation of the motor section 114 (hereinafter, "rotation control signal" and supplies it to the motor drive section 115.

It is to be noted that the motor drive section 115 may supply a rotation signal of the motor section 114 to the signal processing section 51. This allows the signal processing section 51 to detect the number of rotation of the motor section 114 (the number of rotation of the phosphor wheel 11), to control electric power applied to the light source section 12 in accordance with the rotation signal of the detected number of rotation of the motor section 114, and to appropriately adjust the output from the light source section 12 (in particular, first laser group 12A). Therefore, for example, in a case where high-speed rotation becomes difficult for the motor section 114 due to aging, it is possible to automatically reduce the output from the light source section 12, thereby preventing burnout of the phosphor wheel 11 and the like.

In the present embodiment, the control unit 50 further includes the projection mode selecting section 52 and the storage 53.

The projection mode selecting section 52 receives a selection signal for selecting any of a plurality of projection modes (control modes) to be described later as inputted by the user, for example. The projection mode selecting section 52 generates a signal specifying any of the projection modes (hereinbelow, "projection mode specification signal") and supplies it to the signal processing section 51.

Figure 7A:
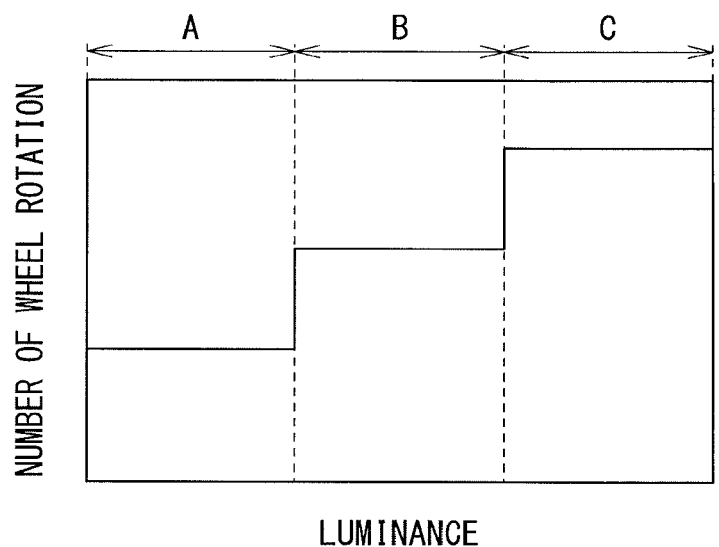
FIG. 7A illustrates an example of a profile of a look-up table indicative of a relation between an excitation light source output value and a number of wheel rotation.
Figure 7B:
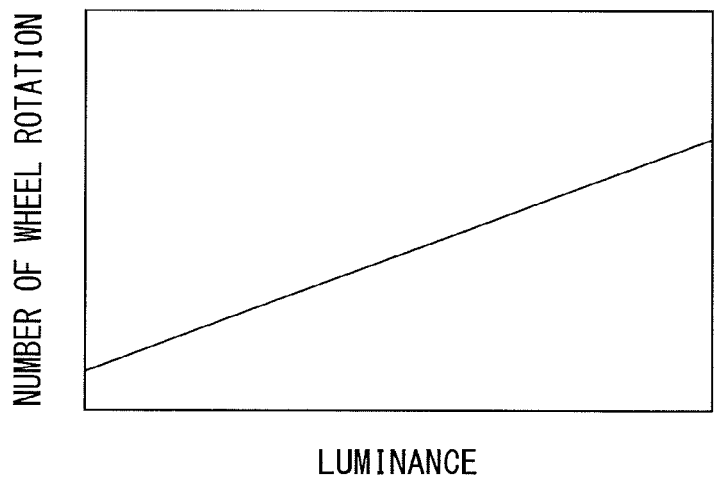
FIG. 7B illustrates another example of the profile of the look-up table indicative of the relation between the excitation light source output value and the number of wheel rotation.
Figure 7C:
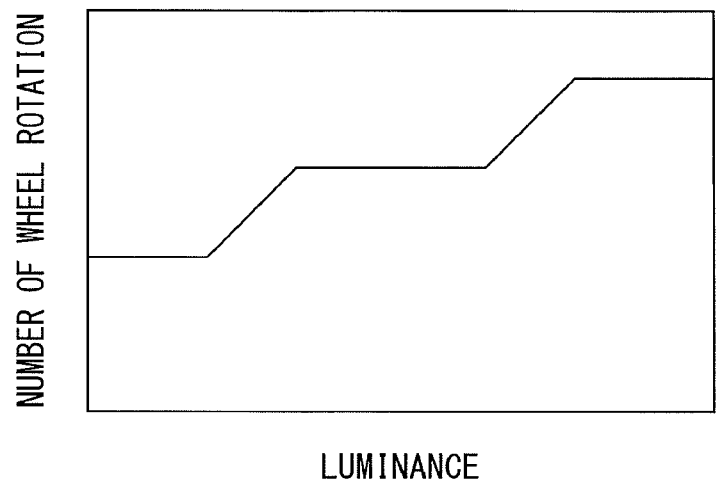
FIG. 7C illustrates another example of the profile of the look-up table indicative of the relation between the excitation light source output value and the number of wheel rotation.
Figure 7D:
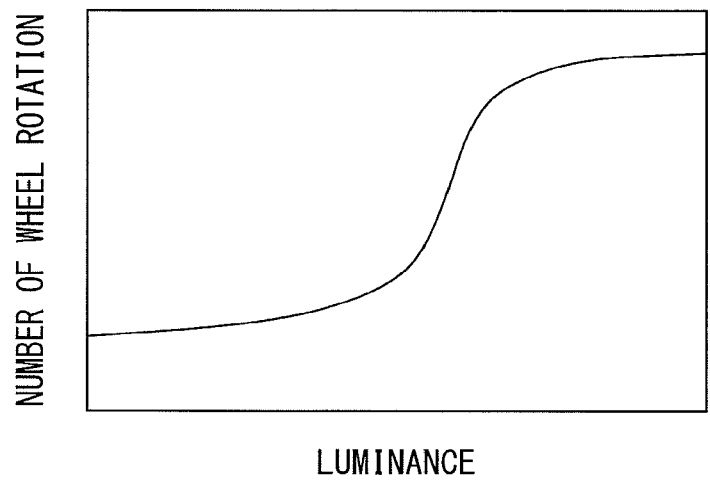
FIG. 7D illustrates another example of the profile of the look-up table indicative of the relation between the excitation light source output value and the number of wheel rotation.

The storage 53 stores therein a look-up table in which, for example, luminance of the excitation light EL1 emitted from the light source section 12 (output value of the light source section 12, intensity) is associated with the number of rotation of the phosphor wheel 11. FIGS. 7A to 7D illustrate examples of the profile of the look-up table. The horizontal axis indicates the output value (luminance) of the light source section 12, and the vertical axis indicates the number of rotation of the phosphor wheel 11. It is to be noted that the output value corresponds to, for example, a PWM (pulse width modulation) duty ratio or a current value. The number of wheel rotation may change in a stepwise manner in accordance with the intensity of the excitation light EL1 as illustrated in FIG. 7A, or may continuously change in proportion to the intensity of the excitation light EL1 as illustrated in FIG. 7B. Alternatively, as illustrated in FIG. 7C, FIGS. 7A and 7B may be combined to present a continuous change in accordance with the intensity of the excitation light EL1 for a certain period upon change in the number of wheel rotation. Moreover, as illustrated in FIG. 7D, the number of wheel rotation may change exponentially and logarithmically in accordance with the intensity of the excitation light EL'.

Alternatively, the storage 53 may store therein a relational expression (a relational expression using, for example, Sigmoid function, step function, monotone increasing function, or the like) for calculating the number of rotation of the phosphor wheel 11 with respect to the intensity of the excitation light EL1 emitted from the light source section 12.

1-2. Method of Controlling Projection Display Apparatus

Next, a method of controlling the projection display apparatus 1 is described.

In a state where the image light is generated by the liquid crystal panels 222A to 222C, specifically in a state where an image is projected from the projection unit 40 onto the screen 600 (at the time of image projection), the projection display apparatus 1 according to the present embodiment makes it possible to control the intensity of the excitation light EL1 outputted from the light source section 12 and the number of rotation of the phosphor wheel 11 (specifically, the number of rotation of the motor section 114), and the number of rotation of the motor section 114 varies in conjunction with the intensity of the excitation light EL1.

The projection display apparatus 1 includes, as described above, the projection unit 40 including the phosphor wheel 11 and the light source section 12, and the control unit 50. The control unit 50 makes it possible to control the number of rotation of the motor section 114 that rotates the phosphor wheel 11 in accordance with the intensity of the excitation light EL1 optionally emitted from the first laser group 12A at the time of image projection. Specifically, the control unit 50 increases the number of rotation of the motor section 114 in accordance with the increase in the intensity of the excitation light EL1 emitted from the first laser group 12A and reduces the number of rotation of the motor section 114 in accordance with the decrease in the intensity of the excitation light EL1 emitted from the first laser group 12A.

In the present embodiment, a variation range of the intensity of the excitation light EL1 emitted from the first laser group 12A and the number of rotation of the phosphor wheel 11 (for example, the number of rotation of the motor section 114) (for example, the intensity between 1500 and 3000 lumen and the number of rotation between 2500 and 4000 rpm) is divided into a plurality of divisions (control divisions) and the control unit 50 is allowed to control the intensity of the excitation light EL1 emitted from the first laser group 12A and the number of rotation of the motor section 114 in accordance with the control division (control mode).

As the control divisions of the intensity of the excitation light EL1 emitted from the light source section 12 and the number of rotation of the phosphor wheel 11 (number of rotation of the motor section 114), for example, as illustrated in FIG. 7A, the variation range is divided into three divisions (division A, division B, and division C). Here, the division B is a medium-output division with the intensity of the excitation light EL1 and the number of rotation of the motor section being at a medium level in the above-described variation range (for example, the intensity between 2000 and 2500 lumen and the number of rotation between 3000 and 3500 rpm), and indicates a projection mode combining both the luminance and the silence (balance priority mode). The division A is a low-output division with the intensity of the excitation light EL1 being lower than and the number of rotation of the motor section being smaller than those of the medium-output division (for example, the intensity between 1500 and 2000 lumen and the number of rotation between 2500 and 3000 rpm), and indicates a projection mode prioritizing the silence (silence priority mode). The division C is a high-output division with the intensity of the excitation light EL1 being higher than and the number of rotation of the motor section being larger than those of the medium-output division (for example, the intensity between 2500 and 3000 lumen and the number of rotation between 3500 and 4000 rpm), and indicates a projection mode prioritizing luminance (luminance priority mode). In this manner, the projection display apparatus 1 according to the present embodiment includes a plurality of projection modes varying in mutually different ranges of the intensity of the excitation light EL1 and the number of rotation of the motor section 114.

Each projection mode is manually selectable by the user as desired, and the selection signal of the projection mode selected by the user (projection mode specification signal) is supplied from the projection mode selecting section 52 to the signal processing section 51. The signal processing section 51 refers to the storage 53 for the intensity of the excitation light EL1 emitted from the light source section 12 and the number of rotation of the motor section 114 corresponding to the projection mode specification signal, and supplies the drive current setting signal and the rotation control signal to the light source drive section 122 and the motor drive section 115, respectively. This allows the projection display apparatus 1 according to the present embodiment to reduce vibration sound of the phosphor wheel 11 and driving sound of the motor section 114 in accordance with situations, thereby improving the silence.

Figure 8:
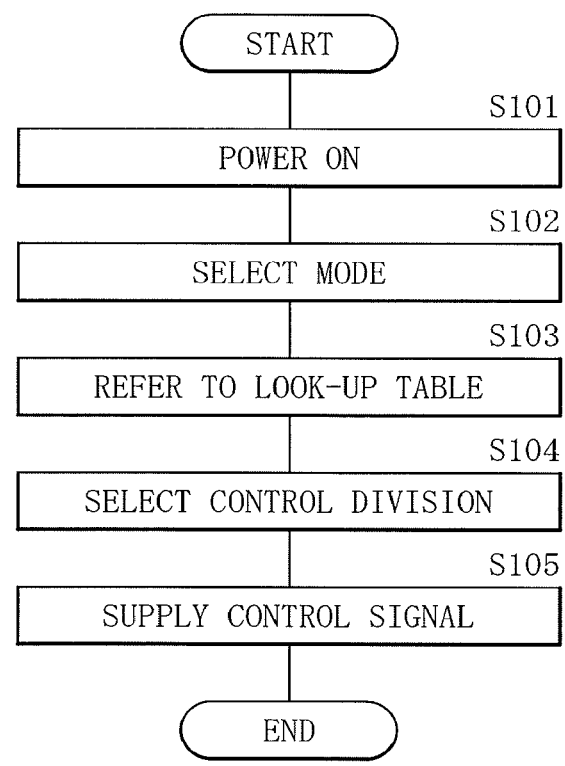
FIG. 8 illustrates a flow from activation to application of an interval of controlling the excitation light source output value.

FIG. 8 illustrates an example of a control flow in the display system of the projection display apparatus 1 according to the present embodiment.

First, a power supply of the projection display apparatus 1 is turned on (Step S101). Subsequently, the selection signal is inputted from the outside (e.g., the user) and the projection mode is selected (Step S102). This allows the projection mode selecting section 52 to generate the projection mode specification signal and supplies it to the signal processing section 51.

Next, the signal processing section 51 refers to the look-up table stored in the storage 53 on the basis of the projection mode specification signal (Step S103), and selects the corresponding control division in the look-up table (Step S104). Finally, a control signal for the corresponding control division is supplied to the light source drive section 122 and the motor drive section 115 (Step S105). This allows the light source drive section 122 and the motor drive section 115 to execute the predetermined projection mode.

1-3. Workings-Effects

As described above, the projection display apparatus (projector) uses the light source device including the light source (light source section) for excitation that emits the excitation light and the phosphor wheel (light converter) that emits light having the wavelength different from that of the excitation light in response to the excitation light. In such a light source device, a motor drives the phosphor wheel in rotation when applying the excitation light to the phosphor layer. The driving sound (vibration sound) of the phosphor wheel is in an audible range. The vibration sound of the phosphor wheel is regarded as noise by users of home projectors. Therefore, there is a demand for reducing the vibration sound of the phosphor wheel at the time of image projection.

In contrast, in a state where an image is projected by the projection unit 40, the projection display apparatus 1 according to the present embodiment makes it possible to control the intensity of the excitation light EL1 emitted from the light source section 12 (specifically, the first laser group 12A) and the number of rotation of the phosphor wheel 11 (specifically, the number of rotation of the motor section 114) and to vary the number of rotation of the motor section 114 in accordance with the intensity of the excitation light ELL Specifically, there is provided the control unit 50 controlling the light source drive section 122 that drives the first laser group 12A, and the motor drive section 115 that drives the motor section 114 that rotates the phosphor wheel 11 at the time of image projection. The control unit 50 respectively generates the drive current setting signals for setting the drive current of the first laser group 12A based on the control signal inputted from the outside and the rotation control signal for setting the number of rotation of the motor section 114, and respectively supplies them to the light source drive section 122 and the motor drive section 115. The control signal inputted from the outside is the projection mode specification signal that specifies, for example, three projection modes of which the intensities of the excitation light EL1 emitted from the first laser group 12A and the numbers of rotation of the motor section 114 that rotates the phosphor wheel 11 (the numbers of rotation of the phosphor wheel 11) are different from one another.

From the above, the projection display apparatus 1 according to the present embodiment makes it possible to reduce the vibration sound of the phosphor wheel 11 and the driving sound of the motor section 114 that are major causes of noise, in accordance with the situation, thereby improving the silence.

2. Modification Examples

Next, modification examples (modification examples 1 and 2) according to the above-described embodiment are described. In the following, components similar to those of the above-described embodiment are denoted with the same reference numerals, and descriptions thereof are omitted where appropriate.

2-1. Modification Example 1

Figure 9:
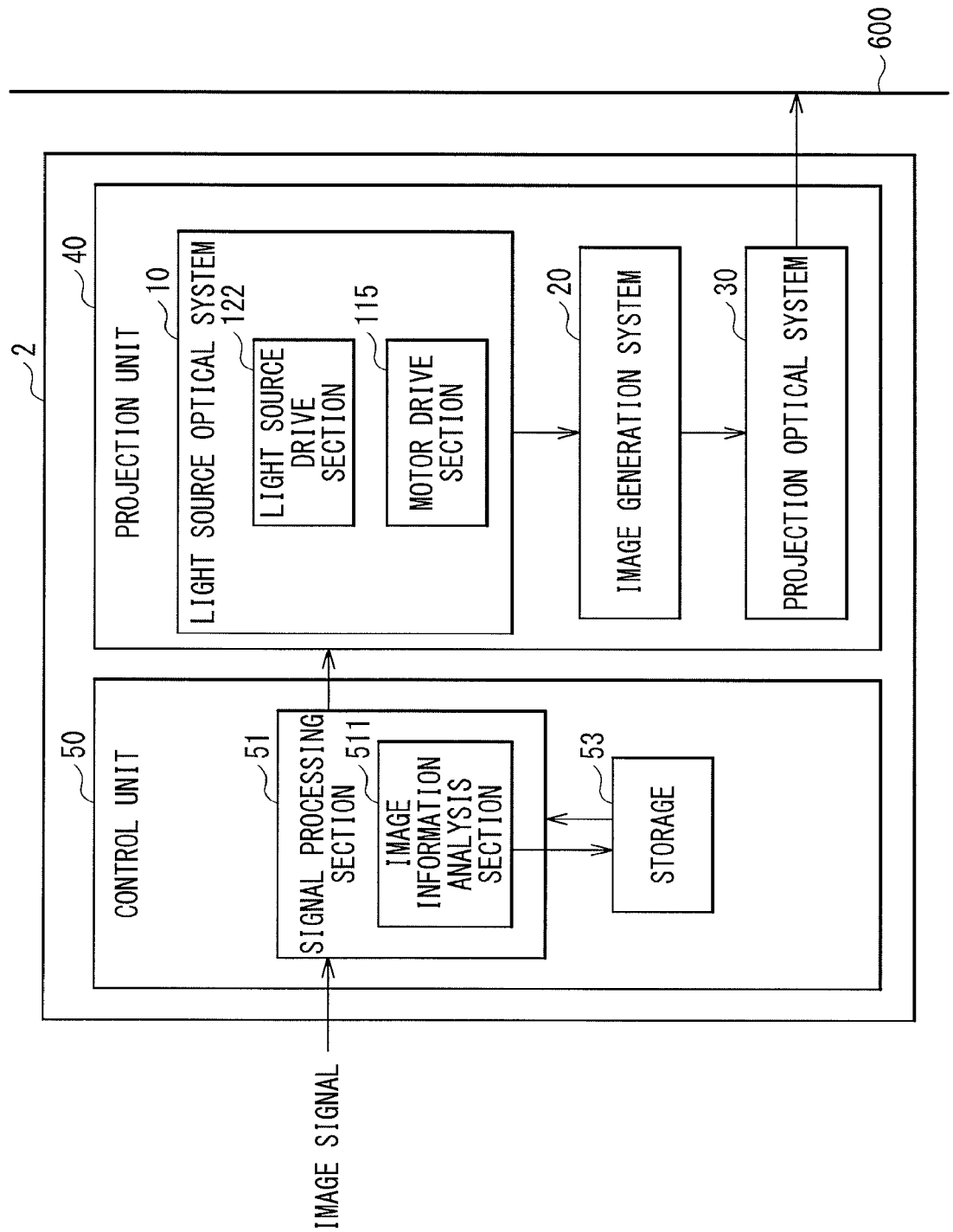
FIG. 9 is a block diagram illustrating a display system of a projection display apparatus according to a modification example 1 of the present disclosure.

FIG. 9 illustrates a display system of a projection display apparatus 2 according to a modification example of the present disclosure in a block diagram. The projection display apparatus 2 according to the present modification example includes an image information analysis section 511 added to the signal processing section 51 of the display system described in the above-described embodiment, for example, in place of the projection mode selecting section 52.

The image information analysis section 511 obtains, for example, image information such as luminance and a histogram of the image inputted from the outside, analyzes it, and thereby determines a light control value (e.g., an output of the light source section 12). The signal processing section 51 refers to, for example, the look-up table stored in the storage 53 on the basis of the light control value obtained by the image information analysis section 511, and determines the corresponding number of wheel rotation. The signal processing section 51 respectively generates the drive current setting signals for setting the drive current of the first laser group 12A and the rotation control signal for setting the number of rotation of the motor section 114, and respectively supplies them to the light source drive section 122 and the motor drive section 115.

In this manner, in the above-described embodiment, the description is given for a case where the intensity of the excitation light EL1 emitted from the light source section 12 and the number of rotation of the motor section 114 are controlled at the time of image projection by the user selecting the projection mode, for example. However, the present disclosure is not limited thereto and the control may be performed automatically.

2-2. Modification Example 2

Figure 10:
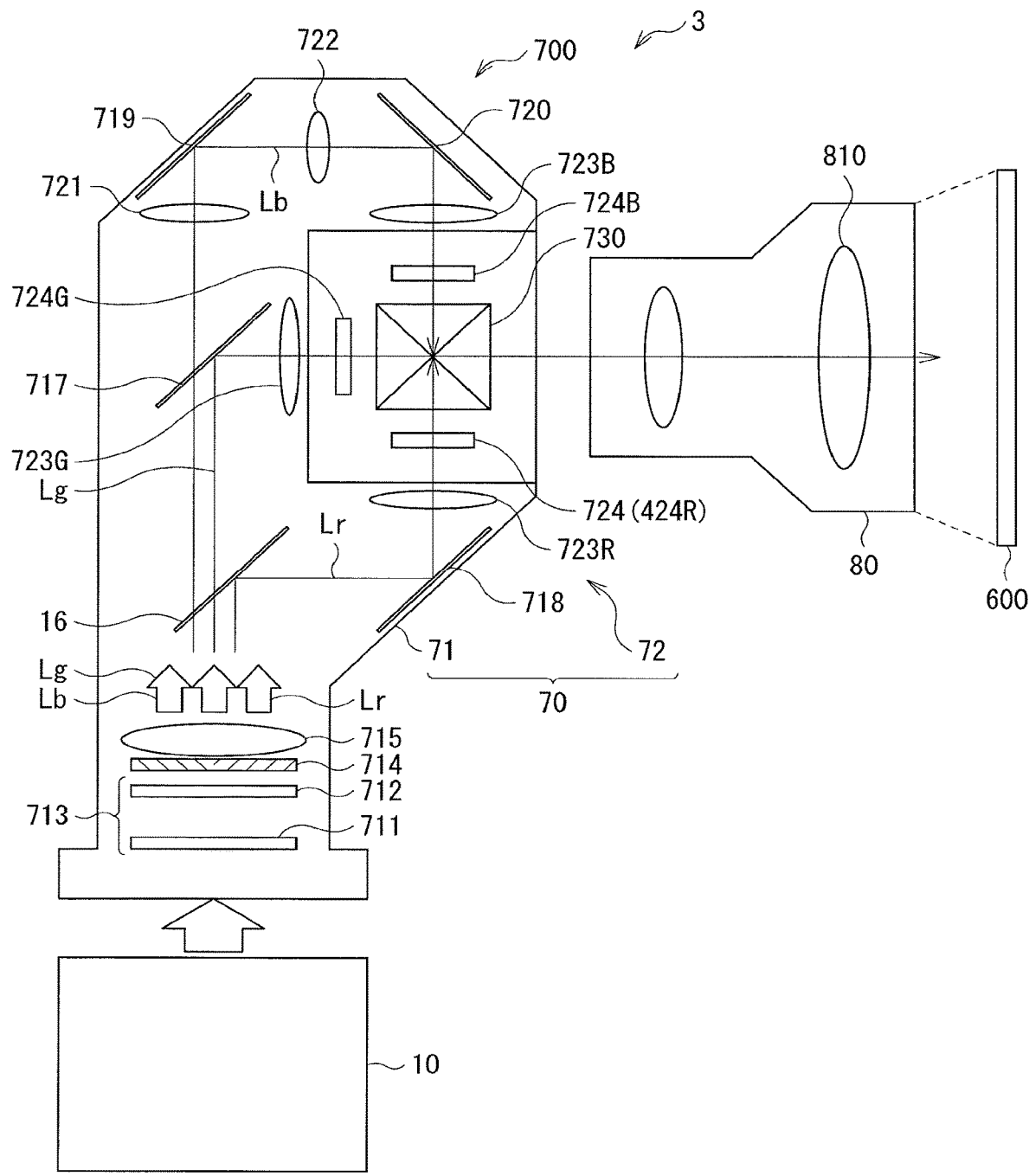
FIG. 10 is an outline drawing illustrating an example of a configuration of an optical system of a projection display apparatus according to a modification example 2 of the present disclosure.

FIG. 10 illustrates an example of a configuration of an optical system of a projection display apparatus 3 according to a modification example of the present disclosure. The projection display apparatus 3 is illustrated in an outline drawing as an example of a configuration of a 3LCD transmissive projector that modulates light by transmissive liquid crystal panels (LCD, liquid crystal panels 724R, 724G, and 724B). The projection display apparatus 3 according to the present modification example includes, for example, the light source optical system 10, an image generation system 70 including an illumination optical system 71 and an image generation section 72, and a projection optical system 80. It is to be noted that the light source optical system 10 has a configuration similar to that in the above-described embodiment and description thereof is omitted in the present modification example.

The illumination optical system 71 includes, for example, an integrator element 713, a polarization conversion element 714, and a condenser lens 715. The integrator element 713 includes a first fly-eye lens 711 including a plurality of microlenses arranged in two dimensions and a second fly-eye lens 712 including a plurality of microlenses arranged corresponding to each of the microlenses on a one-to-one basis.

Light entering the integrator element 713 from the light source optical system 10 (parallel light) is split by the microlenses of the first fly-eye lens 711 into a plurality of pieces of luminous flux, each forming an image on the corresponding microlens of the second fly-eye lens 712. Each of the microlenses of the second fly-eye lens 712 functions as a secondary light source, and a plurality of pieces of parallel light with equal luminance are applied to the polarization conversion element 714 as incident light.

The integrator element 713 as a whole has a function of smoothing the incident light applied from the light source optical system 10 to the polarization conversion element 714 into a uniform luminance distribution.

The polarization conversion element 714 has a function of equalizing a polarization states of the incident light entering via the integrator element 713 or the like. The polarization conversion element 714 outputs the outgoing light including the blue light Lb, the green light Lg, and the red light Lr via the lens 15 or the like disposed on an emission side of the light source optical system 10, for example.

The illumination optical system 71 further includes a dichroic mirror 716 and a dichroic mirror 717, a mirror 718, a mirror 719, and a mirror 720, a relay lens 721 and relay lens 722, a field lens 723R, a field lens 723G, and a field lens 723B, liquid crystal panels 724R, 710G, and 710B, and a dichroic prism 730.

The dichroic mirror 716 and the dichroic mirror 717 have a nature of selectively reflecting color light in a predetermined wavelength range and selectively transmit light in other wavelength ranges. For example, the dichroic mirror 716 selectively reflects the red light Lr. The dichroic mirror 717 selectively reflects the green light Lg out of the green light Lg and the blue light Lb having passed through the dichroic mirror 716. The remaining blue light Lb passes through the dichroic mirror 717. This allows the light outputted from the light source optical system 10 (white light Lw) to be separated into a plurality of pieces of color light of different colors.

The separated red light Lr is reflected by the mirror 718, collimated by passing through the field lens 723R, and then enters the liquid crystal panel R for modulation of the red light. The green light Lg is collimated by passing through the field lens 723G, and then enters the liquid crystal panel 724G for modulation of the green light. The blue light Lb passes through the relay lens 721 to be reflected by the mirror 719, and further passes through the relay lens 722 to be reflected by the mirror 720. The blue light Lb reflected by the mirror 720 is collimated by passing through the field lens 723B, and then enters the liquid crystal panel 724B for modulation of the blue light Lb.

The liquid crystal panels 724R, 724G, and 724B are electrically coupled to an unillustrated signal source (e.g., a PC) that supplies the image signal containing the image information. The liquid crystal panels 724R, 724G, and 724B modulate incident light with respect to each pixel and respectively generate a red image, a green image, and a blue image on the basis of the supplied image signals of respective colors. The pieces of modulated light of respective colors (formed images) enter the dichroic prism 730 to be combined. The dichroic prism 730 overlays and combines the pieces of light of respective colors entered from three directions, and outputs the resulting light toward the projection optical system 80.

The projection optical system 80 includes a plurality of lenses 810 and the like, and projects the light synthesized by the dichroic prism 730 on an unillustrated screen. This allows for displaying a full-color image.

Although the present disclosure has been described above with reference to the embodiment and the modification examples, the present disclosure is not limited to the above-described embodiment and the like and may be modified in a variety of ways. For example, although the description has been given with reference to the example of controlling the intensity of the excitation light EL1 emitted from the first laser group 12A in the light source section 12 in the above-described embodiment and the modification example 1, the present disclosure is not limited thereto and the intensity of the blue laser light (laser light EL2) oscillated from the second laser group 12B may be simultaneously controlled using the method according to the above-described embodiment and the modification example 1.

Moreover, although the description has been made with reference to the projection display apparatus 2 that includes the image information analysis section 511 in place of the projection mode selecting section 52 in the modification example 1, the projection display apparatus 2 may include both the projection mode selecting section 52 and the image information analysis section 511.

Furthermore, although the description has been made specifically with reference to the components of each optical system in the above-described embodiment, not all the components may necessarily be included, and other components may be further included.

Moreover, the present disclosure may also have the following configurations.

(1)

A projection display apparatus, including:

a projection unit including a light source section, a wavelength converter including a discoid member and a motor section, the discoid member including a wavelength conversion layer that converts outgoing light from the light source section to light having a wavelength range different from that of the outgoing light, the motor section rotating the discoid member, and a spatial modulation element that generates image light by modulating light from the light source section and the wavelength converter on the basis of an inputted image signal; and a control unit that controls intensity of the outgoing light emitted from the light source section and a number of rotation of the discoid member in a state where the image light is generated by the spatial modulation element.

(2)

The projection display apparatus according to (1), in which the control unit controls the number of rotation of the discoid member in accordance with the intensity of the outgoing light emitted from the light source section.

(3)

The projection display apparatus according to (1) or (2), in which the control unit controls the number of rotation of the discoid member in a stepwise manner in accordance with the intensity of the outgoing light emitted from the light source section.

(4)
The projection display apparatus according to any one of (1) to (3), in which
the control unit increases the number of rotation of the discoid member in accordance with increase in the intensity of the outgoing light emitted from the light source section, and reduces the number of rotation of the discoid member in accordance with decrease in the intensity of the outgoing light emitted from the light source section.

(5)
The projection display apparatus according to any one of (1) to (4), in which
the control unit includes a plurality of control modes, and
the plurality of control modes have mutually different relations between the intensity of the outgoing light emitted from the light source section and the number of rotation of the discoid member.

(6)
The projection display apparatus according to (5), in which
the control unit executes one control mode selected from the plurality of control modes.

(7)
The projection display apparatus according to (5) or (6), in which
the control unit includes, as the plurality of control modes, a first control mode, a second control mode, and a third control mode,
in the first control mode, the intensity of the outgoing light emitted from the light source section is lower than that in the second control mode, and the number of rotation of the discoid member is smaller than those in the second control mode, and
in the third control mode, the intensity of the outgoing light emitted from the light source section is higher than that in the second control mode, and the number of rotation of the discoid member is larger than those in the second control mode.

(8)
The projection display apparatus according to any one of (5) to (7), in which
the plurality of control modes are manually switchable.

(9)
The projection display apparatus according to (6) or (7), in which
the one control mode from among the plurality of control modes is selected in accordance with a selection signal inputted from the outside.

(10)
The projection display apparatus according to any one of (1) to (9), including:
an image information analysis section that analyzes image information of the inputted image signal.

(11)
The projection display apparatus according to (10), in which
the control unit controls the intensity of the outgoing light emitted from the light source section and the number of rotation of the discoid member on the basis of information obtained by the image information analysis section.

(12)
The projection display apparatus according to (10) or (11), in which the image information analysis section obtains at least one of luminance or a histogram from the inputted image signal.

(13)
The projection display apparatus according to (12), in which
the image information analysis section analyzes the luminance or the histogram that is obtained and determines a light control value.

(14)
The projection display apparatus according to any one of (1) to (13), in which
the control unit includes a storage that defines a relation between the intensity of the outgoing light emitted from the light source section and the number of rotation of the discoid member.

(15)
The projection display apparatus according to (14), in which
the storage stores therein a look-up table or a relational expression for calculating the intensity of the outgoing light emitted from the light source section and the number of rotation of the discoid member.

(16)
The projection display apparatus according to any one of (1) to (15), in which
the projection unit further includes a projection optical system that projects light from the spatial modulation element.

(17)
A method of controlling a projection display apparatus, including:
converting outgoing light emitted from a light source section to light having a wavelength range different from that of the outgoing light in a wavelength conversion layer;
generating image light by modulating, on the basis of an inputted image signal, the outgoing light of which the wavelength is converted, in a spatial modulation element; and
rotating a discoid member including the wavelength conversion layer by a motor section and respectively controlling intensity of the outgoing light and a number of rotation of the discoid member in a state where the image light is generated in the spatial modulation element.

This application claims the benefit of Japanese Priority Patent Application JP2016-215338 filed with the Japanese Patent Office on Nov. 2, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A projection display apparatus comprising:
a projection unit including a light source section, a wavelength converter including a discoid member and a motor section, the discoid member including a wavelength conversion layer that converts outgoing light from the light source section to light having a wavelength range different from that of the outgoing light, the motor section rotating the discoid member, and a spatial modulation element that generates image light by modulating light from the light source section and the wavelength converter on a basis of an inputted image signal; and
a control unit that controls intensity of the outgoing light emitted from the light source section and a number of rotation of the discoid member in a state where the image light is generated by the spatial modulation element, wherein the control unit controls the number of rotation of the discoid member as a function of the intensity of the outgoing light emitted from the light source section.

2. The projection display apparatus according to claim 1, wherein the control unit controls the number of rotation of the discoid member in a stepwise manner in accordance with the intensity of the outgoing light emitted from the light source section.

3. The projection display apparatus according to claim 1, wherein the control unit increases the number of rotation of the discoid member in accordance with increase in the intensity of the outgoing light emitted from the light source section, and reduces the number of rotation of the discoid member in accordance with decrease in the intensity of the outgoing light emitted from the light source section.

4. A method of controlling a projection display apparatus, comprising:

converting outgoing light emitted from a light source section to light having a wavelength range different from that of the outgoing light in a wavelength conversion layer;

generating image light by modulating, on a basis of an inputted image signal, the outgoing light of which a wavelength is converted, in a spatial modulation element;

rotating a discoid member including the wavelength conversion layer by a motor section and respectively controlling intensity of the outgoing light and a number of rotation of the discoid member in a state where the image light is generated in the spatial modulation element; and controlling the number of rotation of the discoid member as a function of the intensity of the outgoing light emitted from the light source section.

* * * * *